Oct. 22, 1968   H. E. GRIFFITH ET AL   3,407,079
PIE CRUST PACKAGE AND METHOD OF PACKAGING
Filed Dec. 21, 1965
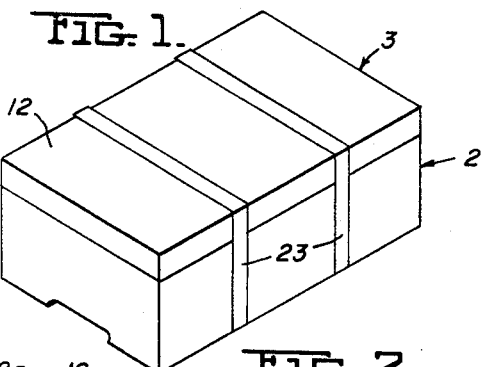
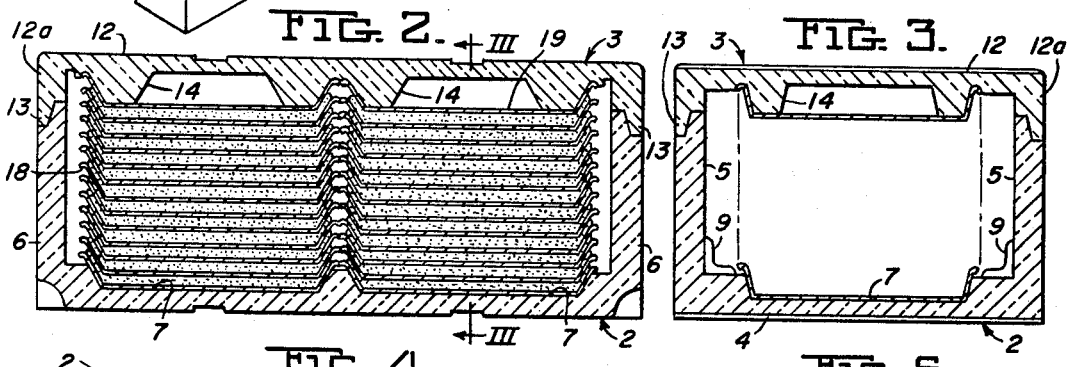
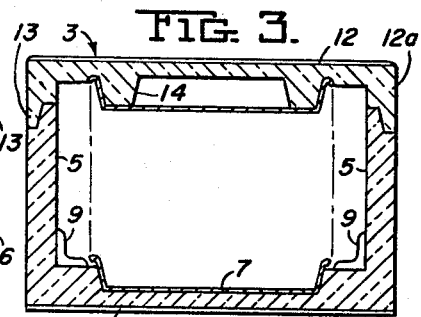
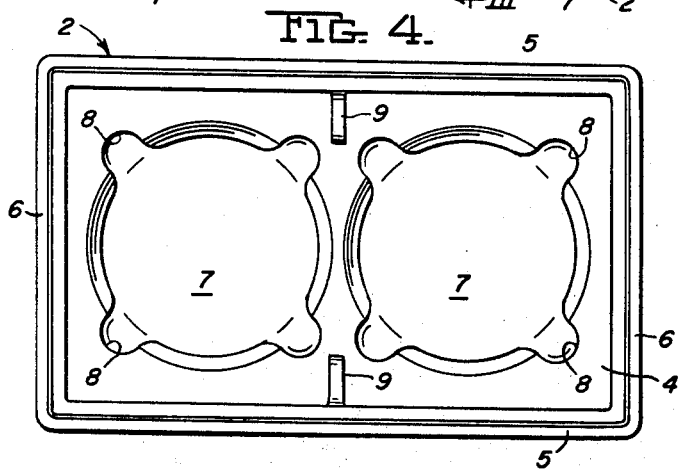
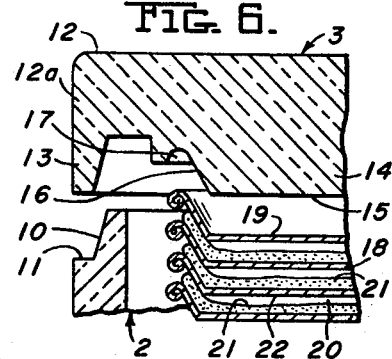
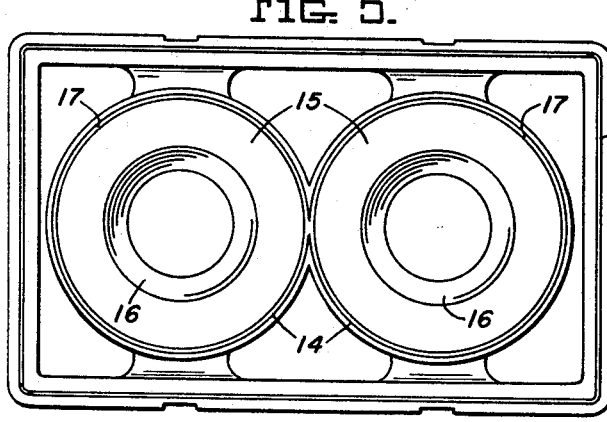
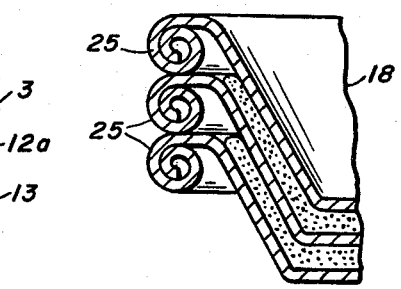
INVENTORS.
HERALD E. GRIFFITH and
RICHARD A. DANKO
By Christy, Parmelee, & Strickland
Attorneys

United States Patent Office 3,407,079
Patented Oct. 22, 1968

3,407,079
PIE CRUST PACKAGE AND METHOD
OF PACKAGING
Herald E. Griffith, Glenshaw, and Richard A. Danko,
New Kensington, Pa., assignors to Star-Kist Foods,
Inc., McKees Rocks, Pa., a corporation of California
Filed Dec. 21, 1965, Ser. No. 515,299
9 Claims. (Cl. 99—172)

This invention is for a method and container arrangement for the packaging and shipping of a quantity of prepared pie crusts.

Graham cracker pie crust is prepared from a dry mix formed principally from graham cracker crumbs, and butter or margarine, with sugar and corn syrup. This mix may be placed in a pie pan and molded and pressed into shape directly in the pan. Many commercial bakers, as well as housewives, prefer to purchase the crust already formed in an expendable aluminum pie pan rather than to make the crust, even though a ready prepared mix for this purpose can be purchased.

An uncooked crust formed in this way simply by pressing and compacting the loose crumbs with only limited bonding material uniting the cracker crumbs is very fragile, and while many bakery supply establishments have machines for rapidly forming the crusts in the pie pans, there is great difficulty and much loss incident to their transportation in quantity to bakeries or stores.

The present invention utilizes a specially formed light weight, rigid box of plastic or other material with a specially formed lid. The box is designed to receive one or more stacks of prepared crusts. In each stack the pan holding one crust fits into the pan and crust immediately beneath, but the bottom of the upper pan cannot initially nest against the crust in the pan below. An empty pan is placed in the crust at the top of the stack, and the initial height of the stack is too high to permit the lid to fit properly into place. The lid has on the under surface a projection that fits exactly into the empty top pan, while the bottom of the receptacle has a cavity into which the bottom pan of the stack exactly fits. When the lid is applied, it is pressed down with sufficient force that each pan in the stack will completely nest in the crust of the pan immediately beneath. Under this pressure the outwardly-flaring side of each crust compacts slightly more and the sides of the pans yield or spring outwardly very slightly. While the resulting relative movement between any two pans is very slight, in a typical stack of twenty-four pans the overall reduction in height of the stack is of the order of an inch and a half. With the bottom pan of the stack nested in the recess of the container and the empty top pan filled by the conforming projection on the cover, there can be no relative shifting movement of the pans and hence no chaffing or breaking of the crust. The lid is then secured to the container preferably by an adhesive tape with pressure-sensitive adhesive. When so packed the crusts can be transported and even mishandled without breaking the crusts. In other words, the crusts and their pans are pressed into a substantially solid column, and because of the solidarity the individual crusts are protected from breakage. The pans and crusts when pressed together will retain sufficient resilience or spring so that they exert a counter thrust against the bottom and cover, thereby assuring that looseness will not develop after the package is completed.

The invention may be more fully understood by reference to the accompanying drawings wherein:

FIG. 1 is a perspective view of the shipping container with adhesive tape passed around it to hold the lid in place;

FIG. 2 is a longitudinal vertical section through the package shown in FIG. 1 with two stacks of crusts therein, and the drawing, for clearness of illustration, does not show the actual relation of the rims of the pans in the completed package;

FIG. 3 is a transverse vertical section in the plane of line III—III of FIG. 2;

FIG. 4 is a plan view of the container with the lid removed;

FIG. 5 is a plan view of the under side of the lid;

FIG. 6 is a fragmentary vertical section through the top portion of the container and one stack of crusts in the initial condition with the cover in position to be pressed down, the view showing a slightly modified form of cover; and FIG. 7 is a fragmentary view on a larger scale showing how the turned lip portions of the pans contact one another in the completed stack, the view being a vertical section through one part only of a stack.

Referring to the drawings, there is a rigid receptacle 2 and a rigid cover 3. The receptacle has a bottom 4, side walls 5, and end walls 6. As here shown, it is generally of a parallelepiped shaped, and more specifically, in plan it is rectangular. It is preferably integrally molded from a foamed plastic such as is commonly used inside shipping cartons and thermally insulated boxes, foamed polyurethane being one suitable material. Such a material is sufficiently strong but light in weight and relatively cheap for our purposes, and provides good protection to the contents against sudden changes in temperature or exposure to moisture.

Since the receptacle here shown is designed to carry two stacks of pie crusts, it has two similar circular cavities 7 in the bottom, these cavities being flat at the bottom and having outwardly-flaring sides, their shape being such that a standard aluminum foil pie pan will snugly fit into it. Around the periphery of each cavity are opposed pairs of finger notches 8 to provide clearance for one's fingers when lowering a stack of pie crusts into place or lifting them out. Integral gussets 9 are formed midway of the length of the side walls, connecting the side walls and bottom to impart rigidity to the side walls. The top edge of the walls has a peripheral lip 10 that tapers on the exterior from its base toward its top, and there is a ledge 11 around the top of the walls at the base of this lip.

The cover 3 has a top portion 12 that is substantially flat on the exterior, and it has a peripheral flange portion 12a depending therefrom. There is a lip 13 of downwardly-decreasing thickness and having a sloping inner face to fit the lip on the receptacle walls, and when the cover is in place, the bottom of this lip seats on the ledge 11 to resist further downward movement while the interfitting lips 10 and 13 guide the cover as it is being pressed down and hold it against relative lateral movement when it is fully closed.

The cover has two similar circular abutments 14 on the under surface thereof, the bottom face 15 of each of which is flat, and which has an upwardly and outwardly-sloping peripheral side wall 16, the size and contour of which conforms exactly to the interior of a pie pan. There is an annular groove 17 at the base of each abutment to receive the curved edge of the pie pan. The abutment may be in the form of a wide ring, as shown in FIG. 2, but preferably is solid across its face to bear against the entire surface area of the pie pan into which it fits, as shown in FIG. 6. The height or thickness of the abutment is such as to fill the entire depth of the pan into which it fits.

The package is made up by forming the pie crusts in the pans in which they are to be used. These pans are usually formed of thin sheet aluminum, and bakery supply firms commonly have machines for pressing the graham cracker preparation into the pans. The pans with the crusts so formed therein are then nested into stacks, with the same number of pans and crusts in every stack. In the drawings, each stack contains twelve pans with crusts, but in practice we prefer to put twenty-four pans with crusts in a stack, so that a package with two stacks has four dozen of the prepared crusts. When the stack has been prepared, an empty pie pan is placed in the top of each stack. The stacks are then set into the receptacle with the bottom pan of each stack fitted into one of the bottom cavities 7. These stacks are designated 18 and the empty top pan is designated 19.

When the pans with the crusts formed therein are initially stacked, the pans do not nest completely into the crusts of the pan below. This is indicated in FIG. 6 by the space 20 between the surface of the crust 21 and the bottom 22 of the pan immediately above. The number of units in a stack and the height of the container is such that the empty pan at the top is actually above a level that permits the cover to seat on the top of the box. However, the cover is placed over the receptacle with the abutments 14 entering the empty pans 19 and the cover pushed down with considerable pressure. We prefer to use a fluid-operated press for this purpose to apply the pressure evenly, and because of the work necessary to compact the stacks where a large number of crusts are involved. This pressure closes the space 20 so that each crust is then tightly pressed and confined by pressure between two metal surfaces, namely the pan in which it is formed, and the bottom of the pan above. This pressure of course forces the sloping sides of the pans down very slightly, but the crust material reforms to the new angle without injury to the crust. In a stack of twenty-four pans, the reduction in height of the stack is in excess of an inch, and the stack becomes substantially a solid column in which no unit can move in any direction relative to the others, and the stack retains sufficient resilience or spring to keep it under pressure after the cover is applied.

When the cover has been forced fully down and the bottom of the lip 13 is seated on the ledge 11 of the receptacle, so that it cannot be pushed down further, the cover is secured. This may be done by passing strips of pressure adhesive tape 23 around the box, or by other appropriate securing means.

For the purpose of this invention, it will be understood that a pie pan is a pan of the familiar shape with a bottom and sides that flare upwardly and outwardly. They may be of different sizes (i.e., diameters), from the diameter of small individual pies, often referred to as tarts, to oversizes of the standard commercial size, but the receptacle and cover must be shaped to the particular size with which it is to be used, and all pans in any one stack should be the same size. As best seen in FIG. 7, these pans are customarily formed with a rolled lip 25, the thickness of which happens to be about equal to the crust thickness, so that when the stack is put under pressure, the rolled lips or beads around the respective pans in the stack are moved into contact with one another, thereby closing the gap between the rim of each pan and the one beneath. This confines the crusts in the pans so that crumbs that might otherwise break off and escape into the box, creating an unattractive appearance, if nothing more, are entirely confined in place. Also, while we disclose a box-like receptacle for two stacks, the receptacle may be designed for a single stack or any convenient number other than two. Moreover the pans need not be circular, but may be square, rectangular, or of other shape, so long as the interfitting parts of the box and cover are of a shape corresponding to the shape and size of the pans.

The shipping containers may be reused a number of times. Shipping tests indicate that fragile preformed graham cracker crusts may be shipped long distances with normal handling and negligible breakage of the crusts. It is because the stacks are under pressure that the crusts, formed as they are principally of crumbs, do not break up or the crumbs sift out when the package is turned sideways or upside down. Also, while graham cracker crusts are particularly described, the crust may be formed of uncooked pie dough or other prepared or partially prepared pastry.

We claim:
1. A pie crust shipping package for the transportation of a plurality of preformed pie crusts each of which is contained in an individual pie pan wherein the pans have a bottom surrounded by an upwardly and outwardly-flaring wall and the crust conforms to the interior of the pan, said package comprising:
   (a) a rigid box-like receptacle having a bottom and surrounding walls extending upwardly from the bottom,
   (b) the bottom of the receptacle having a cavity therein of a shape and size into which one of said pans will snugly fit,
   (c) a rigid cover for the receptacle that interfits with and rests on the top edge of the receptacle walls,
   (d) said cover having an abutment on the under face thereof projecting therefrom a distance at least equal to the depth of one of the pie pans and a shape and size to fit and snugly nest into one of said pans so that it may bear against the bottom and side wall of such a pan,
   (e) a stack of pie pans with the formed crusts therein with the bottom pan of the stacks received in the cavity in the bottom of the receptacle,
   (f) said stack of pie pans with the crusts therein being compacted between the bottom of the receptacle and the cover into a substantially solid column in which the pans and crusts are held against relative movement, and
   (g) means for releasably securing the cover on the receptacle.

2. A pie crust shipping package as defined in claim 1 wherein there is an empty pie pan in the top of the stack through which the abutment on the cover applies pressure to the stack as the cover is applied to the receptacle.

3. A pie crust shipping package as defined in claim 1 in which the receptacle and the cover are both formed of a molded foamed plastic.

4. A pie crust shipping package as defined in claim 1 in which there are finger notches at the periphery of the cavity in the bottom to facilitate the placing of the stack in the cavity or the removal thereof from the cavity.

5. A pie crust shipping package as defined in claim 1 in which the receptacle and cover are rectangular and said cavity and abutment are at one end of the receptacle and cover, respectively, and said cavity and abutment are duplicated at the other end of the receptacle and cover, respectively, and there is a second stack of pans with crusts in the second cavity engaged by the second abutment.

6. A pie crust shipping package as defined in claim 1 wherein the pans in the stack each have a bead formed around the periphery, and the pans in the stack are compacted to an extent such that the beads of the pans contact the beads of adjacent pans to thereby confine crust material in the pans against escape.

7. A method of packaging prepared pie crust for shipment wherein the pie crusts are preformed and contained in individual pie pans, each pan being of the same size and shape with a bottom and a surrounding side wall that flare upwardly and outwardly, said method comprising:
   (a) stacking a number of pie pans with the crusts therein with the bottom of one pan in the stack spaced slightly above the surface of the crust in the pan beneath,
   (b) placing said stack in a receptacle having a bottom with a cavity therein to which the lowermost pan in the stack fits and which provides support for the bottom and sides of said pan,
   (c) applying a cover adapted to seat on the side wall of the receptacle to said receptacle, which cover has an abutment shaped to fit into the topmost pan in the stack and conform to the bottom and sides thereof, the stack being of a height to initially hold the cover above its normal position where it seats against the top of the receptacle, (d) applying pressure to the cover to compact the stack and close the spaces between the crusts in the stack and the bottoms of the pans next above and thereby compact the stack into a substantially solid column in which the pans are held against relative movement and the crusts confined between the pans in which they are contained and the under side of the overlying pans and fully seat the cover on the receptacle, and (e) finally securing the cover on the receptacle to hold the stack in this compacted state.

8. A method of packaging prepared pie crusts as defined in claim 7 in which an empty pie pan is placed in the uppermost crust in the stack through which pressure from the abutment on the cover is transmitted to the stack.

9. A method of packaging prepared pie crusts as defined in claim 7 where the pans have peripheral bead portions around their edges, the compacting pressure on the stack of pans being continued until the said bead portions of the pans are in substantial continuous contact with the bead portions of the adjacent pans.

References Cited

UNITED STATES PATENTS

| | | | |
|---|---|---|---|
| 2,576,650 | 11/1951 | Sonnenberg | 206—65 |
| 2,829,057 | 4/1958 | Voelker | 99—172 |
| 3,190,758 | 6/1965 | Hauf | 99—172 |
| 3,379,536 | 4/1968 | Foss et al. | 99—172 |

RAYMOND N. JONES, *Primary Examiner.*

S. DAVIS, *Assistant Examiner.*